(12) United States Patent
Latham

(10) Patent No.: US 10,597,005 B1
(45) Date of Patent: Mar. 24, 2020

(54) ANTI-TIP DEVICE FOR ATV

(71) Applicant: Phillip R. C. Latham, Pinson, TN (US)

(72) Inventor: Phillip R. C. Latham, Pinson, TN (US)

( * ) Notice: Subject to any disclaimer, the term of this patent is extended or adjusted under 35 U.S.C. 154(b) by 0 days.

(21) Appl. No.: 16/520,859

(22) Filed: Jul. 24, 2019

Related U.S. Application Data

(60) Provisional application No. 62/828,097, filed on Apr. 2, 2019.

(51) Int. Cl.
*B60S 9/00* (2006.01)
*B60S 9/02* (2006.01)
*B62D 37/00* (2006.01)

(52) U.S. Cl.
CPC ............... *B60S 9/02* (2013.01); *B62D 37/00* (2013.01)

(58) Field of Classification Search
CPC ......... B60S 9/02; B60D 37/00; B60D 63/065; B60D 33/023
See application file for complete search history.

(56) References Cited

U.S. PATENT DOCUMENTS

| | | | | |
|---|---|---|---|---|
| 4,522,420 A * | 6/1985 | Hannappel | ........... | B62D 63/065 180/196 |
| 4,593,840 A * | 6/1986 | Chown | ..................... | B60R 9/06 224/484 |
| 4,886,294 A * | 12/1989 | Nahachewski | ........... | B62J 27/00 280/755 |
| 5,435,404 A * | 7/1995 | Garin, III | ................ | A61G 5/043 180/6.5 |
| 5,881,937 A * | 3/1999 | Sadler | ........................ | B60R 9/06 224/509 |
| 6,802,441 B1 * | 10/2004 | DuRant | .................... | B60R 9/065 224/513 |
| 6,923,280 B2 * | 8/2005 | Goertzen | ................ | A61G 5/043 180/65.1 |
| 7,264,272 B2 * | 9/2007 | Mulhern | ................. | A61G 5/043 180/65.1 |
| 7,562,903 B2 * | 7/2009 | Kramer, Jr. | ............... | B62H 1/12 180/907 |
| 7,770,913 B2 * | 8/2010 | Cannon | ................. | B62D 63/061 280/278 |
| 8,851,214 B2 * | 10/2014 | Mirzaie | ................... | A61G 5/043 180/65.1 |
| 9,340,087 B2 * | 5/2016 | Atkinson | .............. | B62D 33/023 |
| 2005/0127631 A1 * | 6/2005 | Schaffner | ................ | A61G 5/042 280/124.1 |
| 2006/0076747 A1 * | 4/2006 | Pauls | ...................... | A61G 5/043 280/124.11 |

* cited by examiner

*Primary Examiner* — Hau V Phan
(74) *Attorney, Agent, or Firm* — Chambliss, Bahner & Stophel, P.C.

(57) ABSTRACT

An anti-tip device for an all-terrain vehicle (ATV) having a T-shaped first support member formed by a first section and a second section with opposing left and right ends. A trailing end of the first section mounts between the ends of the second section. A leading end of the first section removably connects to the rear end of the ATV. A ground contact member is located on the T-shaped first support member and includes a bottom that is spaced away from the ground surface when front and rear wheels of the ATV are in contact with the ground surface. The ground contact member contacts the ground surface when the front wheel rotates about the rear wheel and away from the ground surface in order to prevent rotation that would cause the front wheel of the ATV to tip backwards over the rear wheel.

18 Claims, 4 Drawing Sheets

ANTI-TIP DEVICE FOR ATV

CROSS-REFERENCE TO RELATED APPLICATIONS

This application claims the benefit of U.S. Provisional Patent Application No. 62/828,097, filed on Apr. 2, 2019 and entitled ANTI-TIPPING DEVICE FOR ATV, which is incorporated herein by reference in its entirety.

FIELD

The invention relates generally to accessories for all-terrain vehicles (ATVs) and the like. More particularly, the present invention relates to a wheeled anti-tip device configured for attachment to a receiver hitch of an ATV.

BACKGROUND

All-terrain vehicles (ATVs) are a popular type of vehicle used for leisure and non-leisure activities. ATVs are often ridden in and around areas that would be inaccessible by vehicle or would be difficult to traverse by foot. For example, they are often used in remote or isolated areas, such as desert and mountain areas. They are often used outdoors for riding trails, hunting and carrying game, transporting riders to and from job sites, etc.

ATVs are often used on terrain that is not always smooth and flat. They are frequently used to travel of rocky terrain, over brush, up-and-down crevices in trails, etc. Using an ATV in these areas can be hazardous to the riders due to the size and weight of the ATV, the young age or inexperience of the rider, etc.

ATVs are powerful but are still lightweight when compared to a road vehicle. On one hand, this combination allows the ATV to travel through terrain that would normally be inaccessible to a road vehicle. On the other hand, under certain conditions, the power of the ATV combined with its lightweight can sometimes cause the front end of the ATV to be raised off of the ground and, in some cases, to tip backwards. Tipping might occur, for example, if the ATV is used in climbing a hill that is too steep or if the rear of the vehicle is overloaded. This creates a very dangerous and potentially deadly scenario, especially for the young or elderly rider and for riders located in remote locations or inaccessible terrain.

When an experienced single rider drives an ATV, they can reduce the likelihood of the ATV tipping by shifting their body weight forward to aid in the maneuvering on difficult terrain and rebalancing the vehicle. However, this weight shifting technique may not be possible for inexperienced riders or where more than rider is on the ATV, especially when two riders are using an ATV intended for only a single rider. It also may not be sufficient to prevent the ATV from tipping when a sufficiently heavy enough load is placed onto the rear of the vehicle, such as when hauling large game or other heavy loads on the rear of the ATV.

What is needed, therefore, is an apparatus that will increase the safety of an ATV and reduce the likelihood of it tipping backwards when the rear end is heavily loaded and when it is climbing steep grades.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected", "mounted" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The term "ATV" means all-terrain vehicles and includes quads, three- and four-wheelers, and the like. The term ATV is also used herein to refer to other lightweight utility, recreational, and other multi-purpose vehicles as well as bikes, scooters, motorcycles, etc. that are susceptible to tipping rearwards about a rear wheel or wheelset. The term "caster" means any appropriate rolling apparatus, including casters, rollers, tires, etc. for traversing over a ground surface by rolling.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other needs are met by an anti-tip device for an all-terrain vehicle (ATV) having a T-shaped first support member formed by a first section and a second section with opposing left and right ends. A trailing end of the first section mounts between the ends of the second section. A leading end of the first section removably connects to the rear end of the ATV. A ground contact member is located on the T-shaped first support member and includes a bottom that is spaced away from the ground surface when front and rear wheels of the ATV are in contact with the ground surface. The ground contact member contacts the ground surface when the front wheel rotates about the rear wheel and away from the ground surface in order to prevent rotation that would cause the front wheel of the ATV to tip backwards over the rear wheel.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
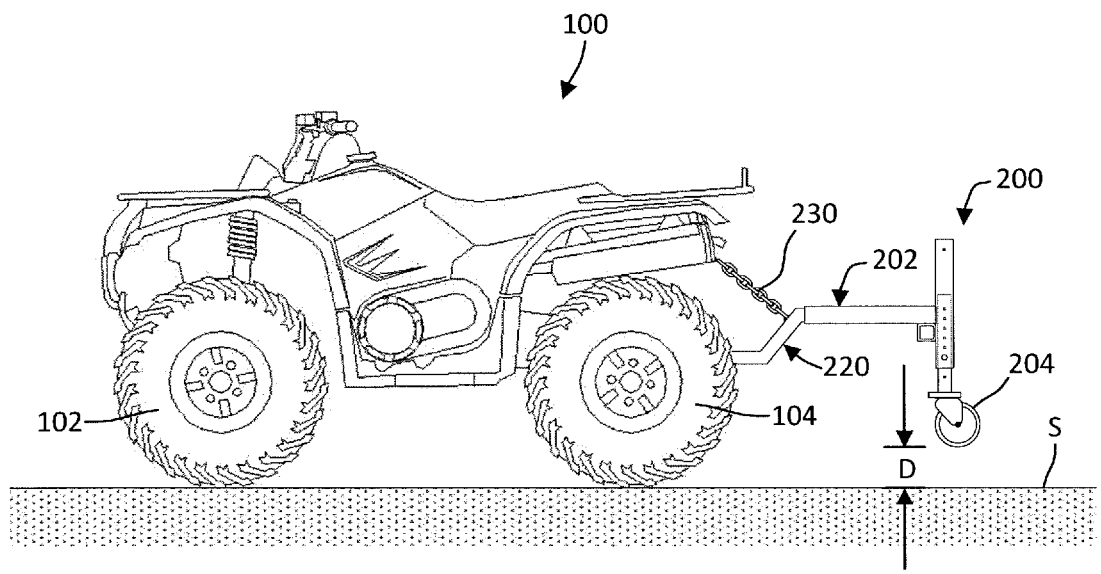
FIG. 1 is a side elevation view depicting an ATV equipped with an anti-tip device according to an embodiment of the present invention.
Figure 2:
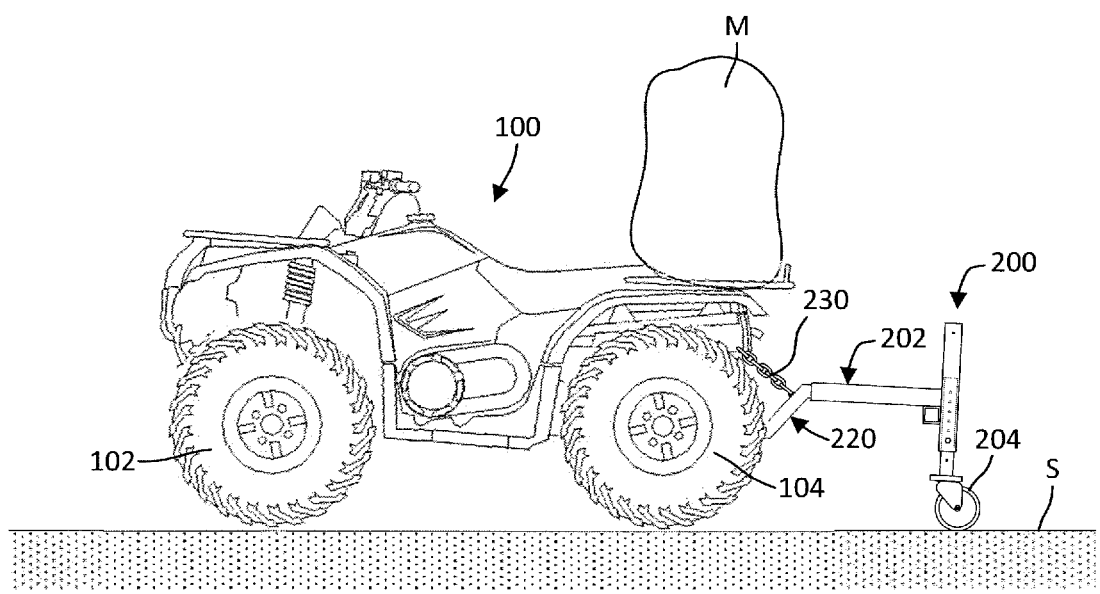
FIG. 2 depicts the ATV of FIG. 1 with a weight placed on a rear cargo rack that causes a wheel of the anti-tip device to be lowered and to contact a ground surface.

Referring now to FIGS. 1 and 2, there is provided ATV 100 having front wheels 102 and rear wheels 104, which, under most normal operating conditions, remain in contact with ground surface S. However, ATV 100 is sometimes placed under non-normal loading and terrain conditions, which might cause front wheels 102 of ATV 100 to rotate about rear wheels 104 (clockwise, as shown in FIG. 2). For example, placing a large enough mass M above and at least partially behind the center of rear wheel 104 might cause the ATV to tend to tilt backwards. Mass M could represent a person, large game, etc. that is loaded onto a cargo area of the ATV behind the driver. With continued overloading, front wheels 102 might eventually rise upwards away from ground surface S and rotate clockwise with respect to rear wheels 104, which might cause ATV 100 to tip over backwards. Rolling an ATV in this manner can be very dangerous and could seriously injure or kill the driver or passengers. However, in this case, ATV 100 is equipped with an anti-tip device 200 according to an embodiment of the present invention that prevents this type of rolling from occurring. Anti-tip device 200 includes first support member 202 to which casters 204 are operatively connected and that may be connected directly to the ATV 100. First support member 202 is constructed such that a bottom of each of casters 204 is spaced a distance D away from ground surface S under normal operating and loading conditions. However, as ATV 100 is overloaded and rotates upwards, casters 204 eventually contact ground surface S and further rotation is prevented or limited.

Figure 5:
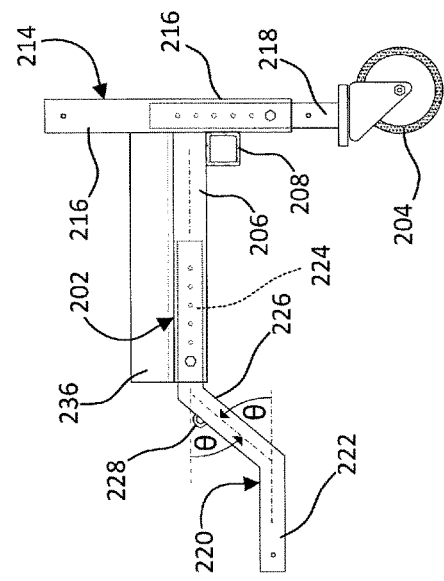
FIG. 5 is a side elevation view of the anti-tip device shown in FIG. 3.
Figure 3:
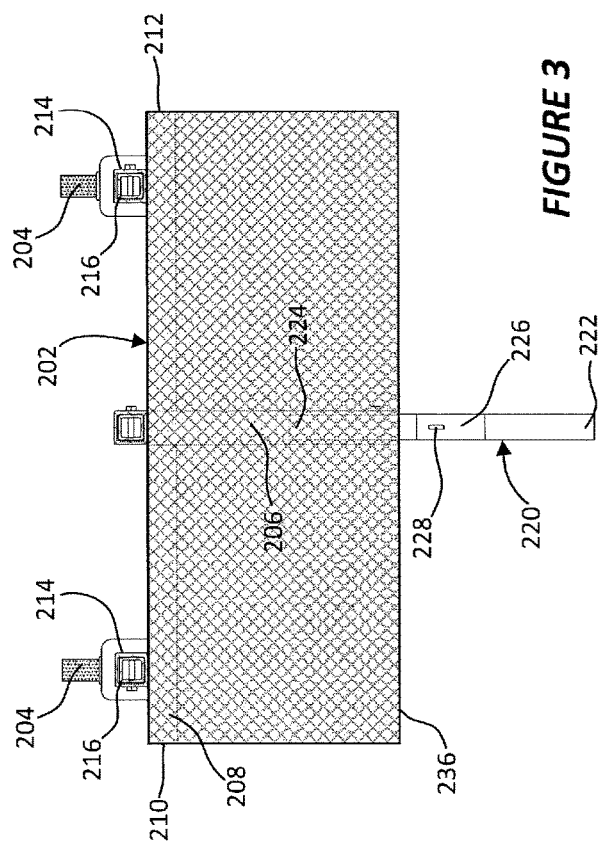
FIG. 3 is a top plan view illustrating an anti-tip device according to an embodiment of the present invention.
Figure 4:
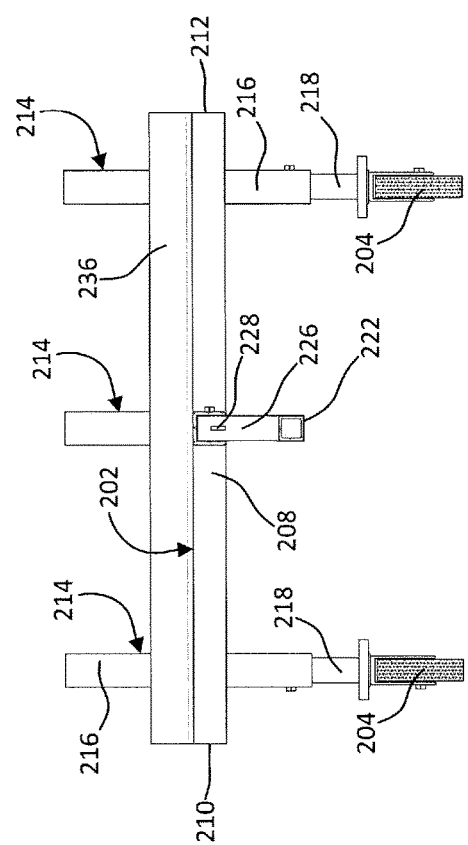
FIG. 4 is a front elevation view of the anti-tip device shown in FIG. 3.

As illustrated in FIGS. 3-5, according to preferred embodiments, first support member 202 includes first section 206 and second section 208. In this particular case, first section 206 is integrally-formed (i.e., as a single component) with second section 208. However, in other embodiments, first section 206 and second sections 208 are separate components, which could allow the first support member 202 to be made more compact. In this particular embodiment, first section 206 bisects the second section 208 at a right angle, such that first support member 202 is "T" shaped. Second section 208 includes left end 210 and right end 212. Cargo tray or rack 236 may be placed onto and removably connected to first support member 202 for carrying passengers or cargo. The first section 206 may be connected directly to the ATV 100 and the casters 104 may be connected to the second section 208

Vertical legs 214 are preferably connected proximate left end 210 and right end 212 of second section 208 of the first support member 202. In this embodiment, vertical legs 214 are nested tubes comprised of an outer portion 216 and an inner portion 218 that slides within the outer portion and that may be fixed at plurality of selected positions with respect to the outer portion in order to vary the length of the vertical leg 214. Caster 204 is preferably located at the bottom end of inner portions 218 of at least two vertical legs 214. Caster 204 may be raised and lowered by sliding inner portion 216 within outer portion 218 and then fixed at a desired vertical position by fixing inner portion 218 within outer portion 216. By raising and lowering caster 204, distance D separating the bottom of the caster and the ground surface S can be modified in order to allow for more or less rotation of the ATV 100 about the rear wheels.

In certain preferred embodiments, a second support member 220 connects the first support member 202 to the ATV 100. More specifically, second support member 220 is provided with leading end 222 that connects to ATV 100, trailing end 224 that connects to first support member 202, and transition section 226 that connects the leading end to the trailing end. Preferably, transition section 226 is angled such that trailing end 224 is positioned vertically above leading end 222 (as illustrated in FIG. 5) such that leading end of second support member 220 is vertically positioned between the vertical position of caster 204 and the vertical position of trailing end of connector. The angled transition section 226 raises casters 204 in order to provide distance D (shown in FIG. 1) between a bottom of the casters and ground surface S. In this particular case, the transition section 226 is sloped upwards at an angle $\Theta$ that ranges from greater than 0° up to and including 90°. In the illustrated case, angle $\Theta$ is approximately 30-50°. In the illustrated embodiment, the angle between the leading end axis and the transition section axis is equal to the angle between the trailing end axis and the transition section axis, such that the leading and trailing ends are parallel to one another. However, in other embodiments, the leading and trailing ends may not be parallel to one another.

Leading end 222 of second support member 220 is preferably configured to removably connect to a rear receiver hitch of ATV 100. In this particular embodiment, second support member 220 is formed using 1¼" square tubing and the leading end 222 is sized for insertion into a square opening of a receiver hitch, where it may be held securely by a pin connection or the like. Trailing end 224 of second support member 220 is preferably inserted into a leading open end of first section 206 of first support member 202. For example, in this particular embodiment, second support member 220 is formed using 1¼" square tubing and first support member 202 is formed using square tubing that is slightly larger so that the second support member 220 may be inserted into the leading end of the first section 206. Second support member 220 preferably slides forwards and backwards within first section 206 of first support member 202 to selectively position the anti-tip device 200 closer or further away from ATV 100, and may be held securely at the desired front-to-back position by a pin connection or the like.

Connection point 228, in the form of a ring, is located on the second support member 220, preferably on transition section 226. In preferred embodiments, chain 230 (shown in FIG. 1), which may include a turnbuckle, adjustable strap, cable, or other similar device, is connected between ATV 100 and connection point 228. This serves as a secondary point of connection between the ATV and the anti-tip device 200, in addition to leading end 222, for securing and stabilizing anti-tip device when it is in use.

Figure 6:
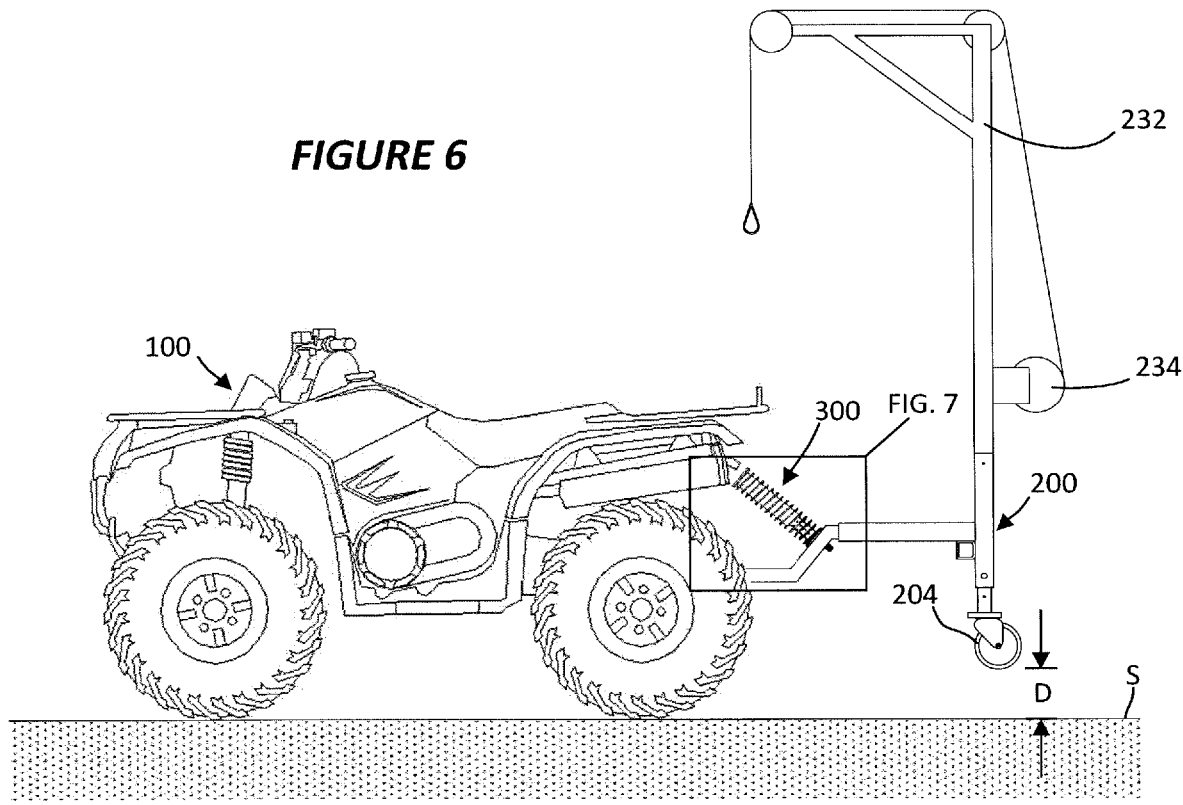
FIG. 6 is a side elevation view of an anti-tip device equipped with a game hoist and cargo rack.
Figure 7:
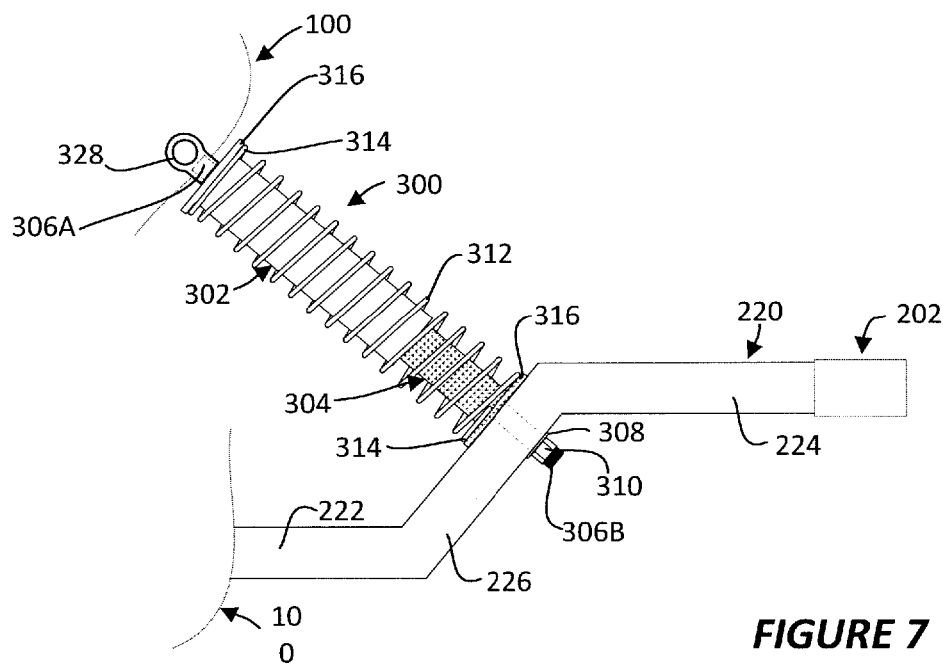
FIG. 7 is a detail view of a portion of the anti-tip device shown in FIG. 6 enclosed within the box labeled "FIG. 7"
Figure 8:
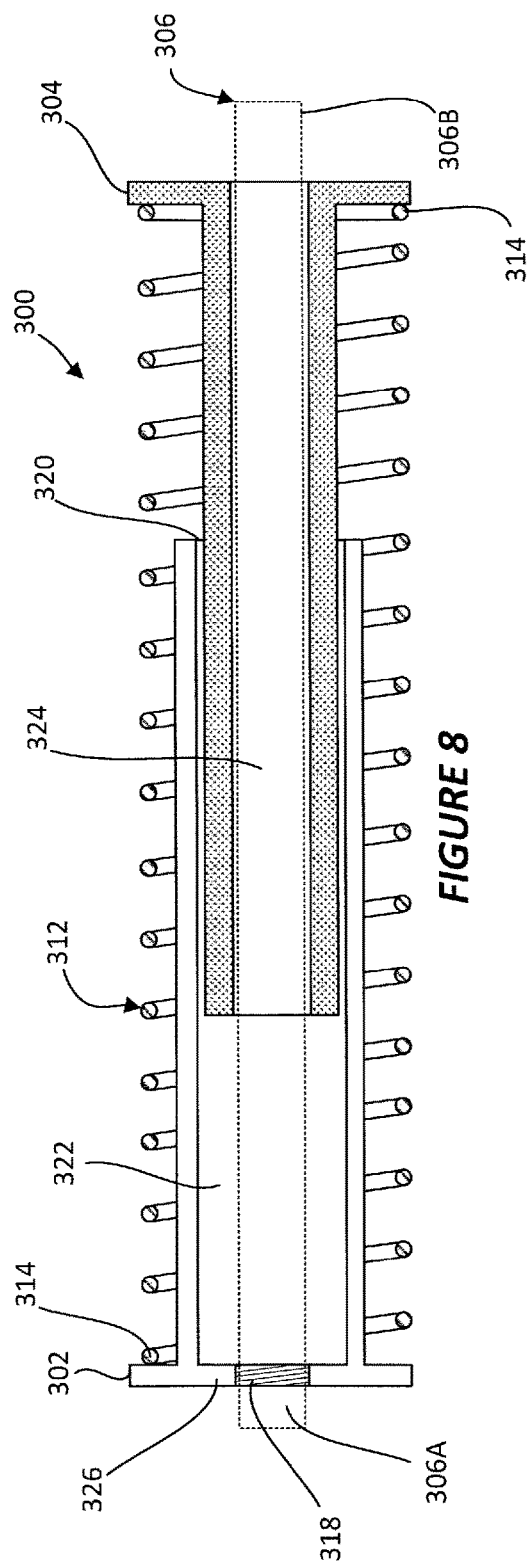
FIGS. 8 and 9 are cutaway views of the shock absorbing linkage of FIG. 9, shown in an extended and a compressed state, respectively.
Figure 9:
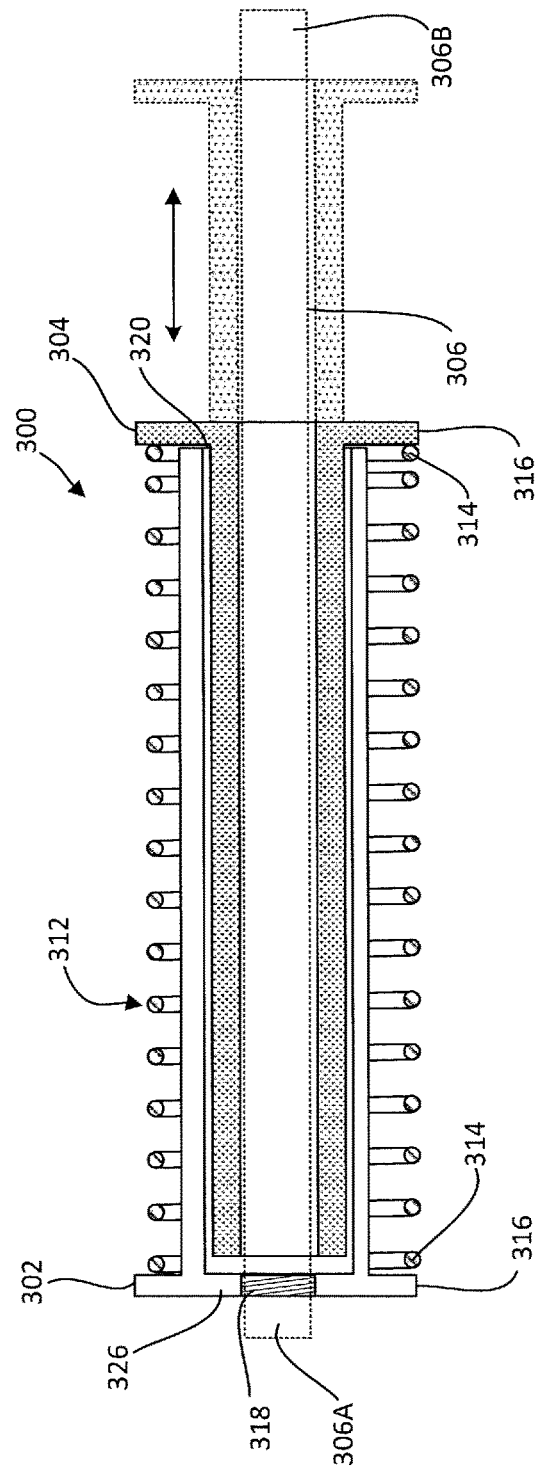

In certain preferred embodiments, chain 230 may be replaced with another linkage apparatus that, in addition to connecting anti-tip device 200 to ATV 100, absorbs shock and biases the anti-tip device in a desired direction. An example of one such shock-absorbing linkage 300 is depicted in FIGS. 6-9, which linkage connects a portion of anti-tip device 200 to ATV 100. Linkage 300 biases anti-tip device 200 downwards (clockwise, as shown in FIG. 6) such that caster 204 is located at a distance D above the ground surface S under normal operating conditions. Linkage 300 also compresses when upwards pressure is applied to second support member 220, such as when caster 204 contacts the ground surface S and prevents the ATV 100 from flipping over backwards. Through this compression, linkage 300 absorbs or dampens shocks to anti-tip device 200 as the anti-tip device is rotated upwards (counter-clockwise, as shown in FIG. 9).

Preferred embodiments of linkage 300 include outer piston tube 302 and inner piston 304. Inner piston 304 is inserted into the piston tube 304 via open end 320, and is configured to slide within hollow interior portion 322. Guide rod 306 extends through the linkage 300, including through a bore 324 formed through the inner piston 304, through the hollow interior portion 322, and out via a threaded opening 318 formed in a closed end 326 of the piston tube 302.

Guide rod 306 includes first threaded end 306A that is threaded into threaded opening 318 formed in end 326 of piston tube 302. As a result of this threaded engagement, guide rod 306 is held at a fixed lateral position with respect to the piston tube 302. Preferably, inner piston 304 slides freely along the guide rod 306 with minimal friction between an expanded position (FIG. 8) and a compressed position (FIG. 9). For that reason, either or both of the piston tube 302 and piston 304 may be formed using a low-friction material, such as high-density polyethylene (HDPE). Additionally or alternatively, a lubricant, grease, etc. may be located between piston tube 302 and piston 304 to facilitate reciprocation of the piston within the piston tube. Spring 312 extends along the length of linkage 300 and opposing ends 314 of the spring are configured to contact shoulders 316 formed at opposite ends of piston tube 302 and piston 304. In the expanded position, spring 314 is uncompressed or, more preferably, minimally compressed between shoulders 316. By sliding piston 304 further into piston tube 302 (i.e., towards the compressed position), spring 312 is compressed even more. A relief valve may be located in piston tube 302 or piston 304 to allow gas trapped within linkage 300 to escape at a selectable flow rate and for the piston to be pushed into the piston tube more or less easily, depending on that flow rate.

Linkage 300 is biased towards the extended position by spring 12 and internal gas pressure within linkage, where compression of the spring and gas pressure are at a minimum. In the extended position, movement of piston 304 with respect to guide rod 306 is preferably limited by a washer 308 and nut 310 threaded onto a threaded second end 306B of the guide rod.

Figure 10:
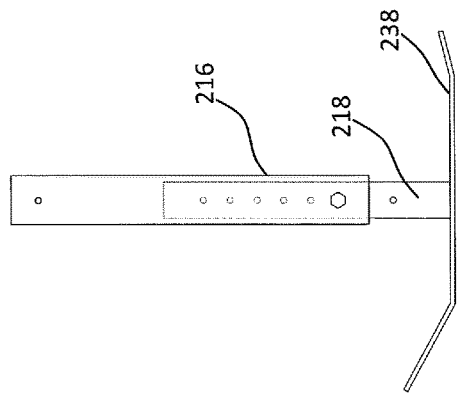
FIG. 10 is a side elevation view depicting a ski that may be used to replace casters shown in FIG. 5 in snowy or icy conditions.

In the illustrated embodiment, vertical leg 214 extends upwards and includes an open top that is configured to receive tubes and the like in order to connect accessories to the rear of the device 200. For example, a game hoist 232 and winch 234 may be removably connected to the device 200 via one of the vertical legs 214. Additionally, as shown in FIG. 10, ski 238 may replace casters at the bottom of vertical legs 214 for use in snowy or icy conditions.

In use, the linkage 300 is preferably connected between the ATV 100 and the transition section 226 of the second support member 220. In the illustrated embodiment, threaded first end 306A of guide rod 306 is connected to a corresponding threaded connector 328 located on ATV 100 and threaded second end 306B of guide rod is preferably inserted through transition section 226 and is fixed in place using washer 308 and nut 310. Inserting second end 306B of guide rod 306 through transition section 226 requires spring 312 to be compressed slightly between contact shoulders 316 of piston tube 302 and piston 304. This slight compression ensures that a slight expanding pressure is applied to transition section 226 and ATV 100 by the linkage 300, which pressure tends to bias the second support member 220 downwards (clockwise, as shown in FIG. 6).

Piston 304 slides freely within piston tube 302 between an expanded position, where the spring is uncompressed or minimally compressed, and a compressed position, where the spring is more compressed. As ATV 100 is overloaded or travels over rough terrain or up steep grades and caster 204 contacts ground surface S, as depicted in FIG. 2, anti-tip device 200 will rotate counter-clockwise as upwards pressure of the ground surface is applied to the device. This counter-clockwise movement of anti-tip device 200 compresses spring 312 and moves linkage 300 towards the expanded position. Once the upwards pressure is removed (e.g., the ATV is not located on a steep grade and the caster 204 is no longer in contact with the ground surface S), the spring force automatically biases second support member 220 in a clockwise direction and piston 304 moves automatically back to the extended position as the spring force is released.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. An anti-tip device for use on an all-terrain vehicle (ATV) that is supported and configured to travel forwards and backwards on a ground surface and that has a rear end, a front end, a front wheel located at the front end, and a rear wheel located at the rear end, the anti-tip device comprising:
   a T-shaped first support member formed by a first section and a second section with opposing left and right ends, the first section having a trailing end that is joined to the second section between the left and right ends and a leading end that is removably connectable to the rear end of the ATV such that the second section is spaced away from the rear end of the ATV;
   a ground contact member disposed on the T-shaped first support member, the ground contact member having a bottom that is spaced a distance D away from the ground surface S when the front wheel and rear wheel of the ATV are in contact with the ground surface, that contacts the ground surface when the front wheel rotates about the rear wheel and away from the ground surface in order to prevent rotation that would cause the front wheel of the ATV to tip backwards over the rear wheel, and is configured to allow the ATV to travel forwards or backwards while the ground contact member is in contact with the ground surface; and a second support member having a leading end that is configured to be removably connected to the ATV and a trailing end that is located opposite the connection and that is configured to be removably attached to the leading end of the first section of the first support member, wherein the leading end of the second support member connects to the rear end of the ATV at a lower vertical position, measured from the ground surface, than a vertical position that the trailing end of the second support member connects to the leading end of the first section of the first support member.

2. The anti-tip device of claim 1 further comprising at least one leg connected to the second section of the first support member and located between the left and right ends of the second section of the first support member, wherein said ground contact member comprises a ground contact member that is disposed on each of the at least one legs such that the bottom of each ground contact member is spaced said distance D away from the ground surface S when the front wheel and rear wheel of the ATV are in contact with the ground surface S.

3. The anti-tip device of claim 2 wherein the at least one leg comprises a nesting tube including an outer portion and an inner portion, wherein the ground contact member is connected to the inner portion and the inner portion slides within the outer portion and may be fixed at a plurality of selected positions with respect to the outer portion in order to vary the distance D.

4. The anti-tip device of claim 3 further comprising:
an opening formed in the outer portion of the at least one leg;
a plurality of openings formed along the inner portion of the at least one leg; and
a pin, wherein, by sliding one of the plurality of openings of the inner portion of the at least one leg into alignment with the opening of the outer portion of the at least one leg and inserting the pin through the aligned openings, the inner portion may be fixed at a selected sliding position with respect to the outer portion.

5. The anti-tip device of claim 1 further comprising:
an elongate leading end of the second support member defining a first axis;
an elongate trailing end of the second support member defining a second axis;
an elongate transition section connected between the elongate leading end and the elongate trailing end defining a third axis; and
an angle $\Theta$ between greater than 0 degrees and up to and including 90 degrees formed between at least one of (i) the first axis and the third axis and (ii) the second axis and the third axis.

6. The anti-tip device of claim 5 wherein the elongate leading end and the elongate trailing end are parallel to one another, such that the angle $\Theta$ is formed between each of (i) the first axis and the third axis and (ii) the second axis and the third axis.

7. The anti-tip device of claim 5 wherein the angle $\Theta$ is rigidly fixed and the trailing end of the second support member slidably engages the leading end of the first section of the first support member to vary the distance between the ATV and the first support member and may be selectively fixed at one of two or more sliding locations with respect to the first support member.

8. The anti-tip device of claim 7 further comprising:
an opening formed in the leading end of the first section of the first support member;
a plurality of openings formed along the trailing end of the second support member; and
a pin,
wherein, by sliding one of the plurality of openings of the trailing end of the second support member into alignment with the opening on the leading end of the first section of the first support and inserting the pin through the aligned openings, the first support member may be fixed at that sliding location with respect to the first support member.

9. The anti-tip device of claim 1 further comprising:
a connection point located on the second support member; and
a linkage apparatus configured to removably connect between the connection point and the ATV.

10. The anti-tip device of claim 1 further comprising a linkage apparatus configured to removably connect between the ATV and the second support member, is configured to be compressed from the expanded position to a compressed position, and, as a result of the compression, to dampen movement of the second support member towards the ATV.

11. The anti-tip device of claim 10 wherein the linkage apparatus is a chain.

12. The anti-tip device of claim 10, wherein the linkage apparatus is biased to the expanded position.

13. The anti-tip device of claim 10 wherein the linkage apparatus further comprises:
an outer piston tube having an open end and a closed end;
inner piston inserted into the piston tube via the open end and being configured to slide within a hollow interior portion formed within the outer piston tube;
a threaded opening formed in the closed end of the outer piston tube;
a bore extending through the inner piston;
a guide rod extends through a bore formed through the inner piston, through the hollow interior portion, and out via the threaded opening;
threads formed on an end of the guide rod threadably engaged with the threaded opening of the closed end of the outer piston tube for fixing the rod with respect to the piston tube such that the inner piston slides into and out of the hollow interior portion along the guide rod;
a nut threadably engaged with a threaded end of the guide rod extending from the inner piston and through the second support member for limiting the motion of the inner piston along the guide rod;
external shoulders formed at opposing ends of the inner piston and outer piston tube; and
a spring having opposing ends contacting the external shoulders for biasing the linkage apparatus to the expanded position.

14. The anti-tip device of claim 13, wherein the spring is at least partially compressed between the shoulders in the expanded position.

15. The anti-tip device of claim 1 further comprising a cargo storage area disposed on top of the first support member.

16. The anti-tip device of claim 1 wherein the ground contact member is a caster.

17. The anti-tip device of claim 1 wherein the ground contact member is a ski configured for forward or backward motion.

18. An anti-tip device for use on an all-terrain vehicle (ATV) that is supported on and is configured to travel forwards and backwards over a ground surface and that has a rear end, a front end, a front wheel located at the front end, a rear wheel located at the rear end, and a trailer hitch located at the rear end, the anti-tip device comprising:

a cargo area located behind the rear end of the ATV;

a T-shaped frame configured to vertically support cargo located at the cargo area off of the ground surface, the T-shaped frame having a front configured to removably mount to the ATV, a back, and a longitudinal axis extending between the front and back, the frame consisting:

a first support member having a first section oriented parallel with the longitudinal axis and a second section oriented perpendicular to the longitudinal axis, the second section mounted to the first section and located proximate the back of the frame; and a second support member section oriented parallel with the longitudinal axis and having a first end configured to removably connect to the ATV and a second end slidably engaging the first section of the first support member opposite the second section of the first support member;

a ground contact mounted to the frame behind the back of the frame, the ground contact extending downwardly from the frame and having a bottom that is spaced a distance D away from the ground surface when the front wheel and rear wheel of the ATV are in contact with the ground surface, that contacts the ground surface when the front wheel rotates about the rear wheel and away from the ground surface in order to prevent rotation that would cause the front wheel of the ATV to tip backwards over the rear wheel, and is configured to allow the ATV to travel forwards or backwards while the ground contact member is in contact with the ground surface.

* * * * *